US006912477B2

(12) United States Patent
Murray

(10) Patent No.: US 6,912,477 B2
(45) Date of Patent: Jun. 28, 2005

(54) METHOD AND APPARATUS FOR DETERMINING RIDE HEIGHT OF A VEHICLE

(75) Inventor: Patrick Murray, Birmingham (GB)

(73) Assignee: Snap-On Incorporated, Pleasant Prairie, WI (US)

( * ) Notice: Subject to any disclaimer, the term of this patent is extended or adjusted under 35 U.S.C. 154(b) by 0 days.

(21) Appl. No.: 10/359,227

(22) Filed: Feb. 6, 2003

(65) Prior Publication Data
US 2003/0154050 A1 Aug. 14, 2003

(30) Foreign Application Priority Data
Feb. 12, 2002 (IE) .......................... S2002/0103

(51) Int. Cl.[7] .............................. G01C 17/00
(52) U.S. Cl. ........................ 702/153; 701/37
(58) Field of Search ................ 702/153; 701/37, 701/35; 33/608, 293; 700/279

(56) References Cited

U.S. PATENT DOCUMENTS

| 4,977,524 A | 12/1990 | Strege et al. |
| 5,029,397 A | 7/1991 | Palombi |
| 5,295,073 A * | 3/1994 | Celette .................. 701/35 |
| 5,461,564 A * | 10/1995 | Collins et al. ............. 701/37 |
| 5,490,092 A | 2/1996 | Dale et al. |
| 5,734,569 A | 3/1998 | Rogers et al. |
| 6,134,487 A | 10/2000 | Healy |
| 6,323,776 B1 | 11/2001 | Jackson et al. |
| 6,327,785 B1 | 12/2001 | Dale, Jr. et al. |
| 6,405,111 B2 | 6/2002 | Rogers et al. |
| 2002/0023361 A1 | 2/2002 | Jackson et al. |
| 2003/0051356 A1 | 3/2003 | Jackson et al. |

FOREIGN PATENT DOCUMENTS

| DE | 4443413 | 6/1996 |
| DE | 19543299 | 5/1997 |
| EP | 0119876 | 9/1984 |
| EP | 0 757 229 A2 | 2/1997 |
| WO | WO03/074963 A2 | 9/2003 |

OTHER PUBLICATIONS

"Wheel Alignment Specifications 1984–1998". Form No. 1721. dated Feb., 1998, Select pages.
"Rugged, Miniature Position Transducers Solution Guide", undated, 7 pages.
Øyvind Røtbold. "An Enabling Metrology Concept For Body–In–White Process Control", Metronor AS, 1995.
"What is Metronor?", Metronor ASA Product Literature, dated Mar. 17, 1999.

\* cited by examiner

Primary Examiner—John Barlow
Assistant Examiner—Xiuqin Sun
(74) Attorney, Agent, or Firm—McDermott Will & Emery LLP

(57) ABSTRACT

To determine a ride height dimension of a vehicle involves determining a set of spherical co-ordinates in three-dimensional space, for two points related to the vehicle, with respect to a datum point. The vehicle manufacturer designates a reference point and a point related to the vehicle body as the two points that correspond to the ride height specified for the measured ride height dimension. Determining the actual ride height dimension of the vehicle entails computing the dimension from the measured spherical co-ordinates of the two points, for example, as a distance between the points or as a difference in vertical height of the points. Examples of equipment include sensor modules for taking measurements of the co-ordinates of the points and processors for determining the desired ride height dimension from measurements taken by a sensor module.

30 Claims, 5 Drawing Sheets

METHOD AND APPARATUS FOR DETERMINING RIDE HEIGHT OF A VEHICLE

FIELD OF ENDEAVOR

The present subject matter relates to techniques and equipment for determining a ride height dimension of a vehicle.

BACKGROUND

The ride height of a vehicle generally is considered to be the elevation of the vehicle body with respect to the vehicle suspension system. Vehicle wheel alignment is closely related to ride height, since over time, changes in the suspension system due to worn or damaged springs, shock absorbers, ball joints or the like can affect wheel alignment. In general, manufacturers' specifications for wheel alignment factors, such as camber and toe, are provided with respect to the suspension system in new condition, that is to say, prior to deterioration of the system as a result of wear. It is therefore important that changes in the suspension system be accounted for prior to performing wheel alignment. Such changes in the suspension system can be determined by comparing the value of the current ride height with the ideal ride height of the suspension system prior to wear. In general, manufacturers as well as providing the wheel alignment factors for an ideal suspension system also provide corresponding factors for suspension systems with varying degrees of wear, which can be determined by variance in the ride height of the vehicle from the original specification.

Devices for determining ride height of a vehicle are known. One type is essentially an electronic measuring tape, which is suitable only for measuring the vertical height of one or more predetermined points on a vehicle body or the suspension system above the ground. In general, this device is unsatisfactory, since, manufacturers often provide ride height data for vehicles as the vertical distance between two predetermined points. One such point may be on the vehicle body, or the suspension system of the vehicle, but fixed relative to the vehicle body. The other manufacturer specified measurement point is normally on the vehicle suspension system, but fixed relative to the ground plane. Such predetermined points, in general are not located vertically one above the other; and in many vehicles the configuration of the suspension system prevents direct measurements. Accordingly, since the apparatus of Strege is only capable of making direct linear measurements, it is entirely unsuitable for measuring the ride height of the majority of vehicles. A further disadvantage of the apparatus of Strege is that the accuracy of the measurement is partially dependent on the operator manually placing the apparatus in the vertical direction, which due to human error may not always occur. Where the ride height of a vehicle is given as a non-vertical dimension, for example, an angular dimension, whereby a line joining the points from which the ride height is to be measured would make an angle with the vertical, in general, the apparatus of Strege is entirely unsuitable.

Another type of prior art measuring device is capable of determining vertical height between respective predetermined points on the vehicle body and suspension system. However, this type of device suffers from one particularly important disadvantage in that the apparatus must be oriented to be in the same vertical plane as the two predetermined points, the vertical distance between which is to be determined. A further disadvantage of the device is that the device must be located on the ground at the same level as the wheels of the vehicle. This is not always possible, particularly if the vehicle is placed over a service pit, or on a ramp. Another disadvantage of this type of device is that it is unsuitable for taking measurements between the outer body of a vehicle and ground level, and in certain cases the manufacturer's specification requires that the ride height of a vehicle is determined by the distance of a point on the vehicle body above ground level.

There is therefore a need for a method and apparatus for determining the ride height dimension of a vehicle which overcomes the problems of known methods and apparatus.

SUMMARY

The present subject matter is directed towards providing such a method and apparatus to determine vehicle ride height, so as to overcome one or more problems such as those outlined above.

As disclosed herein, a method for determining the ride height dimension of a vehicle involves determining spherical co-ordinates for two designated measurement points relative to a datum point (serving as the origin in the spherical co-ordinate system). The first measurement point is a reference point, whereas the second measurement point is a predetermined point on the vehicle. The method also entails computing the required ride height dimension of the vehicle, from the spherical co-ordinates of the respective predetermined point on the vehicle and the reference point.

The processing can measure differences in height or distance or the like, between any two designated points in space. For typical ride height measurements, the two points usually are points on or around the vehicle, which have been specified by the vehicle manufacturer.

The reference point (first point) typically is a point having a generally stable relationship relative to a ground plane, for example, independent of the condition of the suspension. In some examples, the reference point is a predetermined point on the vehicle suspension, which is generally fixed relative to the ground plane, such as an axis of the wheel or a center of a bolt or bushing on an arm attached to the spindle. In alternative examples, the reference point lies in the ground plane on which the vehicle wheels are supported. The predetermined point (second point) generally has a fixed relationship to the vehicle body and thus moves with changes in height due to movement of the body on the suspension system. In one example the predetermined point is a point on the vehicle body. Alternatively, the predetermined point may be a point on the vehicle suspension fixed relative to the vehicle body. As such, changes in the vertical difference in height between the points or changes in distance between the points represent changes in vehicle ride height.

In one example, Cartesian co-ordinates in three-dimensional space relative to the datum point are computed for the two measurement points, and preferably, the ride height dimension is determined from the Cartesian co-ordinates. Advantageously, the ride height dimension is determined by determining the absolute difference between the vertical component of the Cartesian co-ordinates of the predetermined point on the vehicle and the reference point. In such a measurement technique, the ride height dimension is the vertical distance between the predetermined point on the vehicle and the reference point.

In another example, the spherical co-ordinates of each of the predetermined and reference points comprise the linear radial distance between the datum point and the corresponding one of the measurement points. Hence, determining the vertical co-ordinate of each measurement point entails multiplying the respective linear radial value with a cosine of an angle of the spherical co-ordinates for the respective point relative to a vertical. The ride height dimension then is the difference between the vertical co-ordinate of the first point and the vertical co-ordinate of the second point.

In a specific example, for each measurement point, a first angle is the angle made by a first plane containing the datum point and the corresponding one of the predetermined point on the vehicle and the reference point, with respect to an XZ plane. The XZ plane extends perpendicularly from an XY plane. The XY plane is defined by a horizontally extending Y axis and a horizontally extending X axis. The XZ plane is defined by a vertically extending Z axis and the horizontally extending X axis. The XY plane and the XZ plane are perpendicular to each other. The origin of the X, Y and Z axes coincide with the datum point. A second angle is that made by a second plane containing the datum point and the corresponding one of the predetermined point on the vehicle and the reference point, with respect to the XZ plane. The second plane extends perpendicularly to a YZ plane. The YZ plane is defined by the Y and Z axes and is perpendicular to the XY plane and the XZ plane. The spherical co-ordinates for a respective one of the measurement points consist of the distance from the datum point (origin) to the respective measurement point and the first and second angles for that measurement point.

In another example, the perpendicular distance of the respective predetermined and reference points from the horizontal XY plane containing the datum point is determined by multiplying the cosine of the second angle by the linear radial distance of the corresponding one of the measurement points from the datum point.

In other examples, the ride height dimension of the vehicle corresponds to a manufacturer-specified distance at a non-vertical angle with respect to the ground plane. Determination of such a ride height parameter essentially involves calculating the distance between the two measurement points. In an embodiment of such a methodology, the system computes Cartesian co-ordinates of each of the first and second points relative to the datum point, from the spherical co-ordinates of the first and second points. The Cartesian co-ordinates of the measurement points are processed to determine distance between the measurement points.

Additionally, an apparatus is provided for determining the ride height dimension of a vehicle. The apparatus includes means for determining a set of spherical co-ordinates in three-dimensional space for a reference point relative to a datum point. The means also determines a set of spherical co-ordinates in three-dimensional space for a predetermined point on the vehicle relative to the datum point. A computing element computes the required ride height dimension of the vehicle from the spherical co-ordinates of the respective predetermined point and the reference point.

An example of the determining means comprises a sensor module having a housing, which defines X, Y and Z axes that are mutually perpendicular to each other. The Z axis is a vertical axis, and the X and Y axes are horizontal axes. The origin of the X, Y and Z axes defines a datum point. The housing includes means for locating the housing with the Z axis extending vertically. A linear measuring probe is used to measure a linear radial distance between the datum point and each one of the predetermined point on the vehicle and the reference point for determining a linear co-ordinate of respective sets of spherical co-ordinates of the two measurement points. A first angle measuring means determines respective first angle co-ordinates of the predetermined and reference points, based on angular orientation of the probe. The first angle co-ordinates relate to the angle made by a first plane containing the datum point and the corresponding one of the predetermined and reference points with an XZ plane. The first plane extends perpendicularly from an XY plane. A second angle measuring means determines respective second angle co-ordinates of the predetermined and reference points based on angular orientation of the probe. The second angle co-ordinates relate to the angle made by a second plane containing the datum point and the corresponding one of the predetermined and reference points with the XZ plane. The second plane extends perpendicularly to the YZ plane. The YZ plane is defined by the Y and Z axes, the XZ plane is defined by the X and Z axes, and the XY plane is defined by the X and Y axes.

In another example, a probe is located in the housing for aligning with the corresponding one of the predetermined and reference points. The linear measuring device and the first and second angle measuring means co-operate with the probe, when the probe is aligned with the corresponding one of the predetermined and reference points for determining the radial distance between the datum point and the corresponding one of these two measurement points and for determining the corresponding first and second angles of the one point.

In one example, the probe is a contactless probe. Such a probe may take the form of a laser range finder.

In an alternative example, the probe is a contact probe. A linear distance measuring means associated with the contact probe determines the respective radial distances of the respective predetermined and reference points from the datum point. The first and second angle measuring means determine the respective first and second angles of the respective predetermined and reference points, when the probe is in contact with the respective ones of the predetermined and reference points.

In a further example, either type of probe may be mounted on a pair of pivot mountings disposed at 90° to each other. This arrangement enables pivoting of the probe through respective angles at 90° to each other. The first angle measuring means determines the angle through which the probe pivots about one of the pivot mountings through the horizontal XY plane from the XZ plane, for determining the first angles when the probe is aligned with the respective predetermined and reference points. The second angle measuring means determines the angle through which the probe pivots about the other of the pivot mountings through the vertical YZ plane from the XZ plane for determining the second angles, when the probe is aligned with the respective predetermined and reference points.

Additional advantages and novel features of the examples will be set forth in part in the description which follows, and in part will become apparent to those skilled in the art upon examination of the following and the accompanying drawings or may be learned by production or operation of the examples. The advantages of the various concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE EXAMPLES

Figure 1:
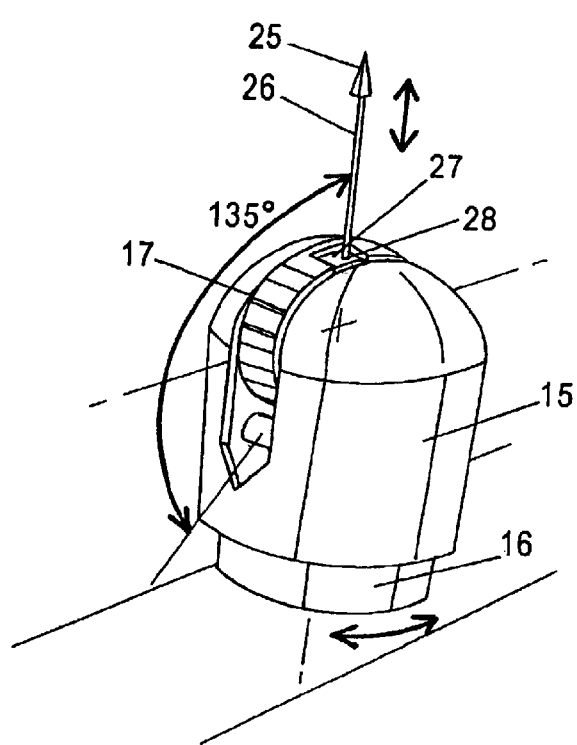
FIG. 1 is a perspective view of a first example of a sensor module used for determining the ride height dimension of a vehicle.

The various devices and measurement techniques disclosed herein relate to determination of the ride height to a vehicle. Such a determination involves determining a set of spherical co-ordinates in three-dimensional space, for two designated measurements points that are appropriately related to the vehicle. The measurement points may be virtually any two designated points in space. Typically, the vehicle manufacturer designates a reference point and a point related to the vehicle body as the two points that correspond to the ride height specified for the measured ride height dimension. Determining the actual ride height dimension of the vehicle entails computing the dimension from the measured spherical co-ordinates of the two points, for example, as a distance between the points or as a difference in vertical height of the two measurement points.

Referring to the drawings and initially to FIGS. 1 to 4, there is illustrated a first sensor module example, indicated generally by the reference numeral 1, used in a system for determining the ride height dimension of a vehicle, namely, a motor vehicle, such as a car, van truck or the like. Before describing the module 1 in detail, the ride height dimension of the vehicle to be determined by the module 1 will first be described with reference to FIGS. 5(a) to 5(c).

Figure 5A:
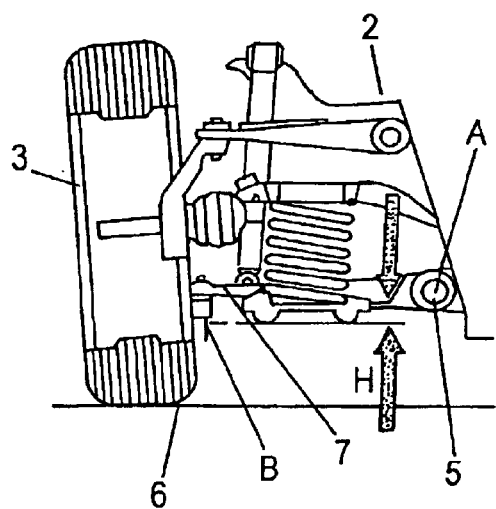
FIGS. 5(a) to 5(c) are elevational views of portions of motor vehicles illustrating the ride height dimension to be determined using the module of FIG. 1

The ride height dimension H of the vehicle, in this case to be determined by using the sensor module 1, is the vertical height between a predetermined point A on the suspension system 3 that is fixed relative to the vehicle body, a portion 2 of which is illustrated, and a reference point B also on the suspension system 3 of the vehicle but fixed relative to the ground plane. In FIG. 5(a), for example, the point A is a geometrical center point of an inner bushing bolt 5, which pivotally connects a suspension arm 7 to the vehicle body 2. The point B is a geometrical center point of an outer busing bolt 6, which pivotally connects the suspension system 3 to the suspension arm 7.

Figure 6:
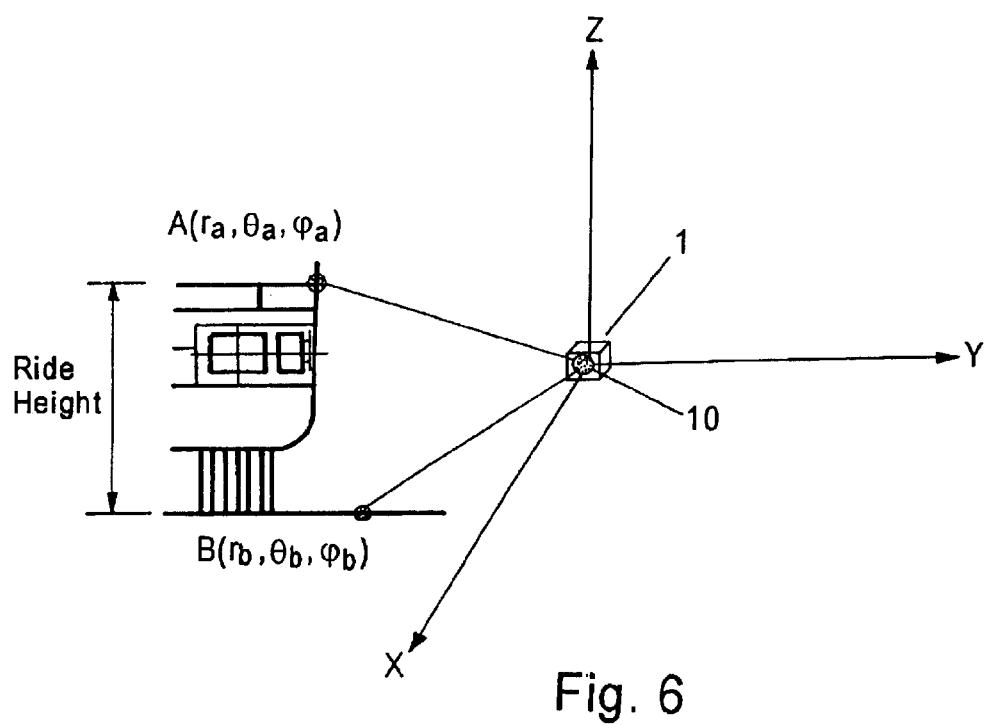
FIG. 6 is a further diagrammatic representation of the module of FIG. 1 in use.
Figure 4:
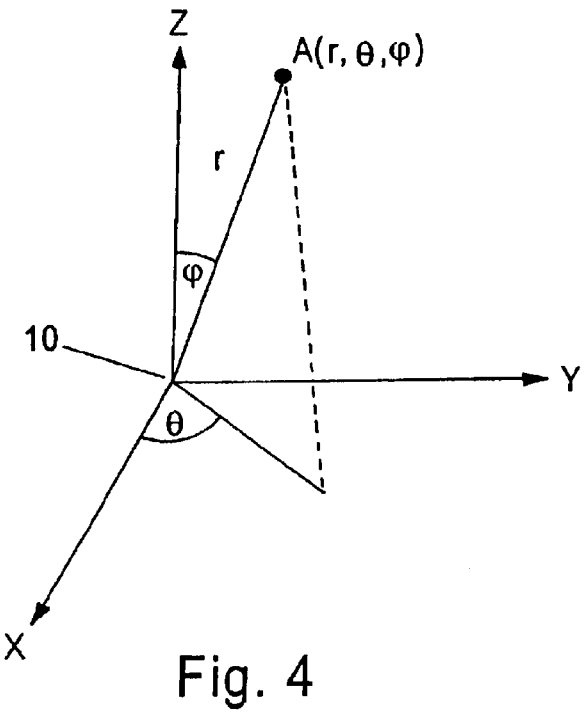
FIG. 4 is a diagrammatic representation of the principle of operation of the module of FIG. 1.

The principle for determining the vehicle ride height will now be described with reference to FIGS. 3 and 4. The exemplary method for determining the ride height of the vehicle requires determination of the spherical co-ordinates of the predetermined point A of the inner bushing bolt 5 and of the spherical co-ordinates of the reference point B of the outer bushing bolt 6. These co-ordinates are determined in three-dimensional space relative to a datum point 10, which is defined by the origin of X, Y and Z axes which in turn are defined by the sensor module 1 as will be described below. The Z axis is a vertical axis, and the X and Y axes are horizontal axes. Hence, the XY plane, the YZ plane and the XZ plane are mutually perpendicular to each other. The XY plane is horizontal, and the XZ and the YZ planes are vertical. The XY plane may correspond to the ground plane, but often the XY plane is offset from the ground plane. In the example of FIG. 6, the horizontal XY plane is somewhat above the ground plane on which the wheels rest.

The spherical co-ordinates of each of the points A and B comprise three co-ordinates. One co-ordinate is a linear dimension co-ordinate, which is the linear radial distance r between the datum point 10 and the corresponding one of the points A and B. The co-ordinates also include a first angle $\theta$ and a second angle $\phi$ for each of the respective points A and B (see FIG. 4). The first angle $\theta$ is the angle which a first plane containing the datum point 10 and the corresponding one of the points A and B extending perpendicularly from the XY horizontal plane makes with the XZ vertical plane. The second angle $\phi$ is the angle which a second plane containing the datum point 10 and the corresponding one of the points A and B extending perpendicularly from the YZ plane makes with the XZ plane. Attention is directed to FIG. 4, where the spherical co-ordinates $r_a$, $\theta_a$ and $\phi_a$ are illustrated.

Figure 3:
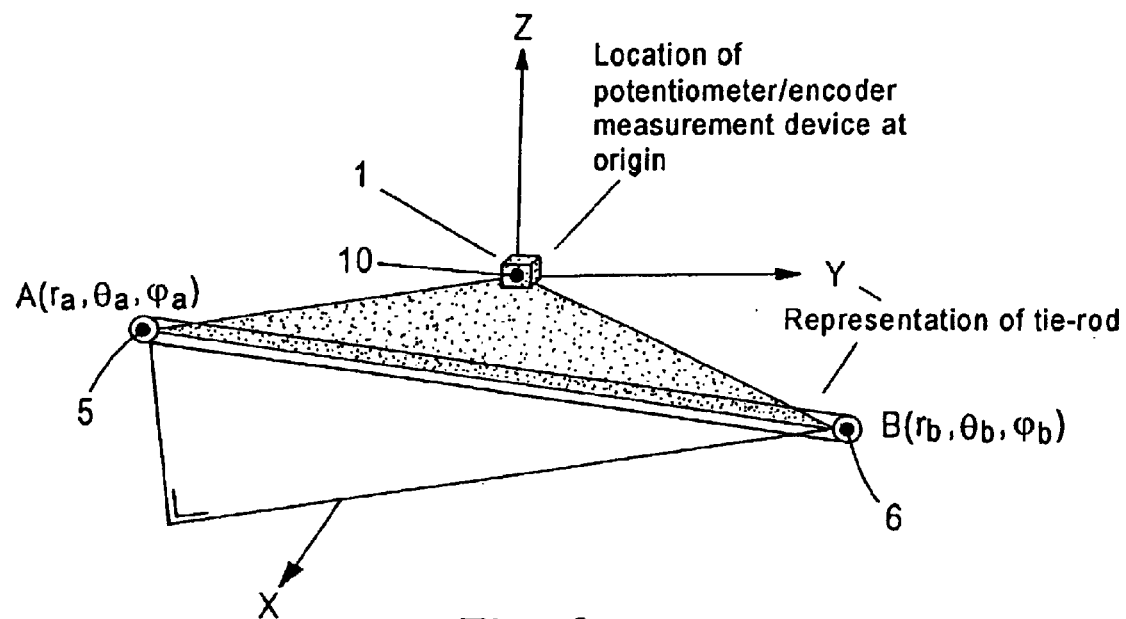
FIG. 3 is a schematic diagrammatic representation useful in explaining the operation of the module of FIG. 1.

Referring now to FIG. 3, the spherical co-ordinates of the points A and B are A $(r_a, \theta_a, \phi_a)$ and B $(r_b, \theta_b, \phi_b)$. Knowing the three spherical co-ordinates of each of the points A and B in three-dimensional space, relative to the datum point 10, the Cartesian co-ordinates of the points A $(x_a, y_a, z_a)$ and B $(x_b, y_b, z_b)$ can readily easily be computed as follows:

$$x_a = r_a \sin \phi_a \cos \theta_a$$

$$y_a = r_a \sin \phi_a \sin \theta_a$$

$$z_a = r_a \cos \phi_a$$

giving A as $(x_a, y_a, Z_a)$; and $$x_b = r_b \sin \phi_b \cos \theta_b$$

$$y_b = r_b \sin \phi_b \sin \theta_b$$

$$z_b = r_b \cos \phi_b$$

giving B as $(x_b, y_b, z_b)$.

The ride height is the difference in vertical height between the two points A and B, which is equivalent to finding the difference in the z Cartesian (pointing upwards) components as follows:

Ride height $H = z_a - z_b$ $$H = r_a \cos \phi_a - r_b \cos \phi_b \tag{1}$$

Figure 5B:
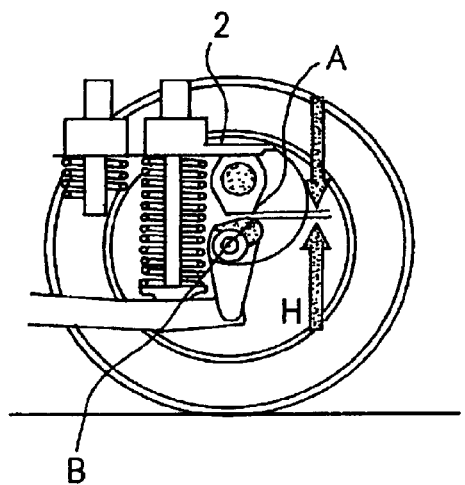
Figure 5C:
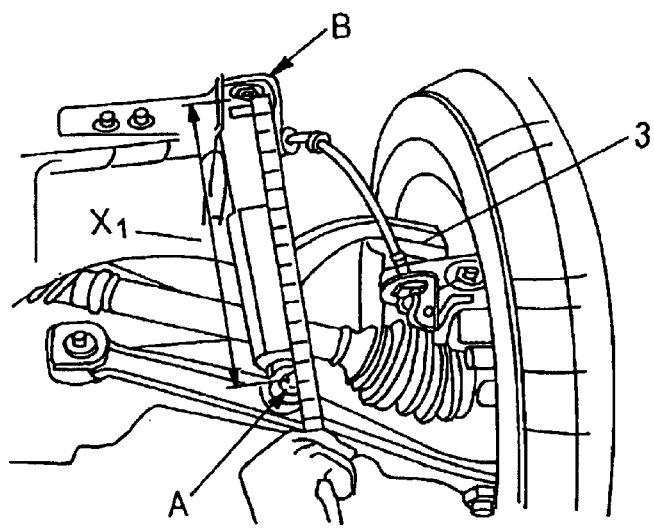

The ride height H is illustrated in FIGS. 5(a) and 5(b).

A somewhat different approach may be used in the event that the manufacturer specifies the ride height as an angular ride height, in other words. In such situations, the ride height is given as the distance along a line joining the two points A and B, whereby the line is at an angle to the vertical, namely, at an angle to the Z axis or to either or both of the XZ and the YZ planes, such as the ride height $X_1$ illustrated in FIG. 5(c). The computation of the ride height $X_1$ is as follows.

Figure 9:
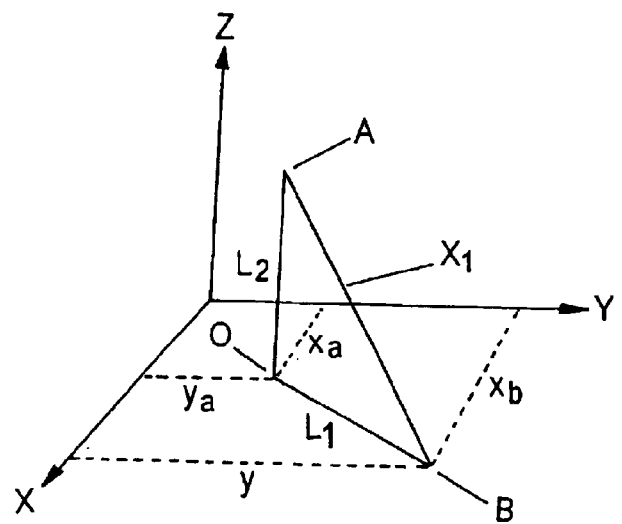
FIG. 9 is a diagrammatic representation of the principle of operation of one of the sensor modules according to another measurement method.

Referring now in particular to FIG. 9, the points A and B are located as described with reference to FIG. 3, and are then converted to Cartesian co-ordinates to give:

$$x_a = r_a \sin \phi_a \cos \theta_a$$

$$y_a = r_a \sin \phi_a \sin \theta_a$$

$$z_a = r_a \cos \phi_a$$

giving A as $(x_a, y_a, z_a)$; and $$x_b = r_b \sin \phi_b \cos \theta_b$$

$$y_b = r_b \sin \phi_b \sin \theta_b$$

$$z_b = r_b \cos \phi_b$$

giving B as $(x_b, y_b, z_b)$.

This forms the triangle $\Delta OBA$. The ride height dimension $X_1$ is given by the hypotenuse of the triangle $\Delta OBA$. The hypotenuse $X_1$ must be determined in the plane of the triangle and not a projection thereof. Therefore, the length of the side BO, namely, the length $L_1$, and the length of the side OB, namely, $L_2$ must first be determined. In Cartesian co-ordinates, $$L_1 = \sqrt{[(x_b - x_a)^2 + (y_b - y_a)^2]}.$$

Using the values derived from the spherical co-ordinates $L_1$ can be determined as follows:

$$L_1 = \sqrt{[(r_b \sin\varphi_b \cos\theta_b - r_a \sin\varphi_a \cos\theta_a)^2 + (r_b \sin\varphi_b \sin\theta_b - r_a \sin\varphi_a \sin\theta_a)^2]}.$$

The $L_2$ side of the triangle is measured in Cartesian co-ordinates, as follows:

$$L_2 = z_a - z_b.$$

Using the values derived from the spherical co-ordinate measurements, $L_2$ becomes:

$$L_2 = r_a \cos \phi_a - r_b \cos \phi_b.$$

The ride height $X_1$ is given by the equation:

$$X_1 = \sqrt{[L_1^2 + L_2^2]}$$

Therefore, the ride height $X_1$ is given by the equation:

$$X_1 = \sqrt{[(r_b \sin\varphi_b \cos\theta_b - r_a \sin\varphi_a \cos\theta_a)^2 + (r_b \sin\varphi_b \sin\theta_b - r_a \sin\varphi_a \sin\theta_a)^2 + (r_a \cos\varphi_a - r_b \cos\varphi_b)^2]} \quad (2)$$

Figure 8:
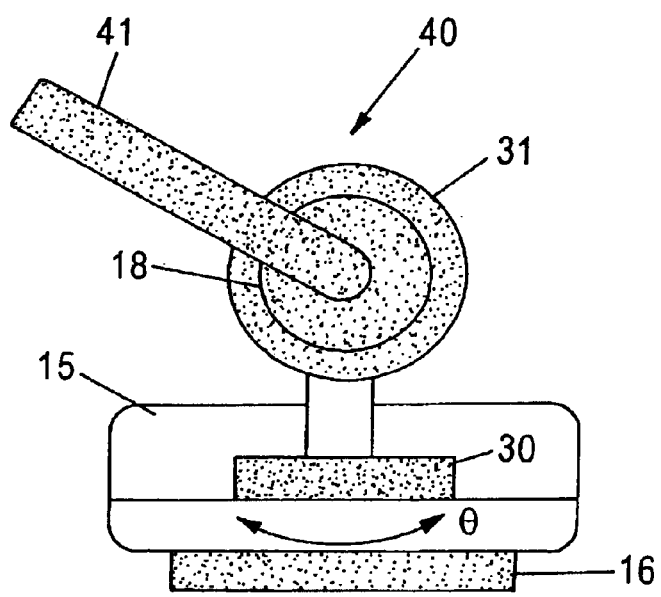
FIG. 8 is a diagrammatic plan view of a sensor module according to another example, used for determining the ride height dimension of a vehicle.

The spherical co-ordinate measurements are taken using a sensor module, such as shown in FIG. 1 or in FIG. 8. The computations are then performed by an appropriate processor of the like, an example of which will be described later with regard to FIG. 10.

Figure 2:
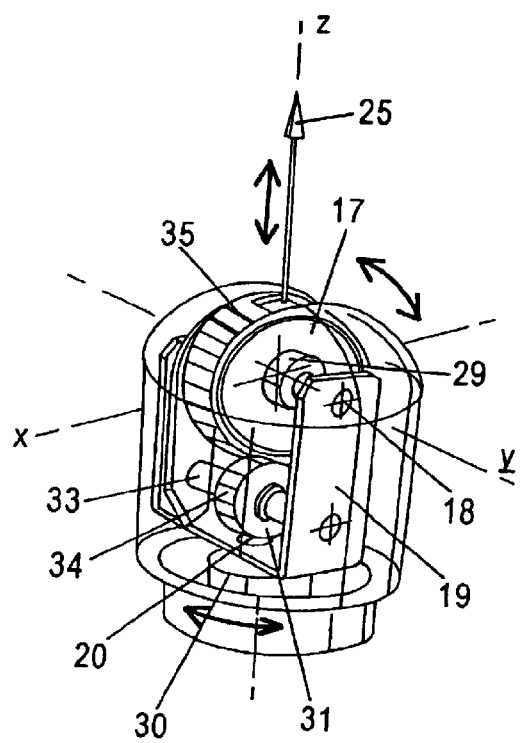
FIG. 2 is a perspective view of the sensor module of FIG. 1 with a portion of its housing removed.

Referring now to FIGS. 1 and 2, the first exemplary sensor module 1 will now be described. The module 1 comprises a housing 15 which is adjustably mounted on a base 16. The base is suitable for ground mounting or mounting on any suitable surface. The housing 15 defines the X, Y and Z axes. An adjustment means (not shown) is provided between the housing 15 and the base 16 to facilitate adjusting the orientation of the housing 15 relative to the base 16, so that when the base 16 is placed on a surface, the orientation of the housing 15 is adjustable so that the Z axis defined by the housing 15 extends vertically. A spool 17 is gimbal mounted in the housing 15 for facilitating pivoting of the spool 17 through 360° about the vertically extending Z axis, and through 225° about the horizontally extending Y axis. The spool 17 is rotatably carried on a horizontal shaft 18 which defines the horizontal Y axis, and which in turn is rotatably carried in a U-shaped mounting bracket 19. The U-shaped mounting bracket 19 is rotatably carried on a vertical mounting shaft 20, the axis of which coincides with the vertical Z axis defined by the housing 15. The rotational axis Y of the spool 17 on shaft 18 intersects the Z axis to define the datum point 10 of the sensor module 1 and thus the origin of the X, Y and Z axes.

A contact probe 25 is carried on the end of an elongated member, namely, a string 26 which is wound onto the spool 17 and biased by a coiled spring onto the spool 17. In other words, the string 26 is wound onto the spool 17 and the coiled spring (not visible) winds the string 26 onto the spool 17. A linear distance measurement device, provided by a main rotary encoder 29 on the horizontal shaft 18, determines the angular rotation of the spool 17 on the horizontal shaft 18. In this manner, the rotary encoder 29 determines the distance that the string 26 is unwound from the spool 17, when the probe 25 is urged from the spool 17 and into engagement with the respective points A and B, for thereby determining the distance 4 of the corresponding respective points A and B from the datum point 10.

The spool 17 is encased and rotates within a casing 27 having an outlet opening 28 for accommodating the string 26 therethrough. The zero position of the casing 27 relative to the horizontal shaft 18 faces directly vertically, and is co-axial with the Z axis for accommodating the string 26 therethrough from the spool 17. Thus, as the contact probe 25 is urged into contact with the respective points A and B, the casing 27 of the spool 17 pivots from its zero position around the horizontal shaft 18, by the action of the string 26 bearing on the edge of the outlet opening 28. Additionally the action of the string 26 bearing on the edge of the opening 28 causes the U-shaped bracket 19 to pivot about the Z axis, until the outlet opening 28 is facing directly in the direction from the datum point 10 to the respective one of the corresponding points A and B.

A first angle measuring means comprises a first rotary encoder 30, which is located in the housing 15 and acts between the U-shaped mounting bracket 19 and the housing 15. The encoder 30 determines an amount of rotation about the vertical (Z) axis of the sensor module 1, essentially to determine the first angle θ (first angular co-ordinate) of a projection of the line between the origin (datum point) and the respective measurement point with respect to a horizontal angular reference (e.g. the X-axis). More precisely, the encoder 30 determines the first angle θ through which the U-shaped bracket 19 rotates from a zero angle relative to the XZ plane, when the outlet opening 28 is in direct alignment with the corresponding one of the points A and B.

A second angle measuring means comprises a second rotary encoder 31, which determines the second angle φ through which the casing 27 of the spool 17 pivots about the horizontal shaft 18 from the XZ plane, when the outlet opening 28 is in direct alignment with the respective ones of the points A and B. The second rotary encoder 31 is rotatably mounted on an intermediate shaft 33 carried in the U-shaped mounting bracket 19. A gear 34 on the second rotary encoder 31 co-operates with a half ring gear 35 on the casing 27 of the spool 17 for determining the second angle φ through which the casing 27 of the spool 17 pivots from a zero angle relative to the XZ plane. Essentially, the second angular encoder 31 measures each respective second angular co-ordinate φ as projected horizontally onto a vertical plane formed by the Z axes and one of the horizontal axes (horizontal reference).

Leads (not shown) from the main rotary encoder 29 and the first and second rotary encoders 30 and 31 feed signals from the respective encoders 29, 30 and 31 to a microprocessor or the like under the control of suitable software. The processor determines the spherical co-ordinates of the points A and B, and subsequently the Cartesian co-ordinates of the points A and B, respectively, from which the vertical ride height H or the angular ride height $X_1$ of the vehicle, whichever may be required, is determined from the equations (1) and (2) above.

In use, the sensor module 1 is located in a suitable location relative to the motor vehicle, and typically, on the ground with the base 16 resting on the ground in a position whereby there is an uninterrupted line of sight between the sensor module 1 and the respective points A and B so that the probe 25 can be extended from the spool 17 and engage with the respective points A and B uninterrupted. The orientation of the housing 15 relative to the base 16 is adjusted so that the Z axis defined by the housing 15 extends vertically. The probe 25 on the end of the string 26 is then urged outwardly from the spool 17 and engaged with one of the points A and B.

The order of taking measurements is not important. Measurements may be taken first with respect to A and then with respect to B, or measurements may be taken first with respect to B and then with respect to A.

When the probe 25 is in engagement with the point A or B, the casing 27 of the spool 17 pivots about the horizontal shaft 18 and the U-shaped mounting bracket 19 pivots about the vertical shaft 20 so that the outlet opening 28 is facing directly towards the point A or B to which the probe 25 has been engaged. The microprocessor is then activated to read the output signals from the main rotary encoder 29, the first rotary encoder 30 and the second rotary encoder 31. From these encoder output signals, the microprocessor determines the spherical co-ordinates r, θ and φ of the point A or B being measured. The contact probe 25 is then engaged with the other of the points A and B, and the microprocessor is again activated to read the signals from the main rotary encoder 29 and the first and second rotary encoders 30 and 31 and determine the spherical co-ordinates of the other of the points A and B. The microprocessor then computes the Cartesian co-ordinates of the respective points A and B from the spherical co-ordinates, and in turn calculates the required ride height H or $X_1$ as already described. Of course, where not all co-ordinates are necessary to determine a particular ride height dimension, e.g. where using only the vertical components of the Cartesian co-ordinates, other components of the co-ordinates may be discarded or not calculated as appropriate.

Figure 7:
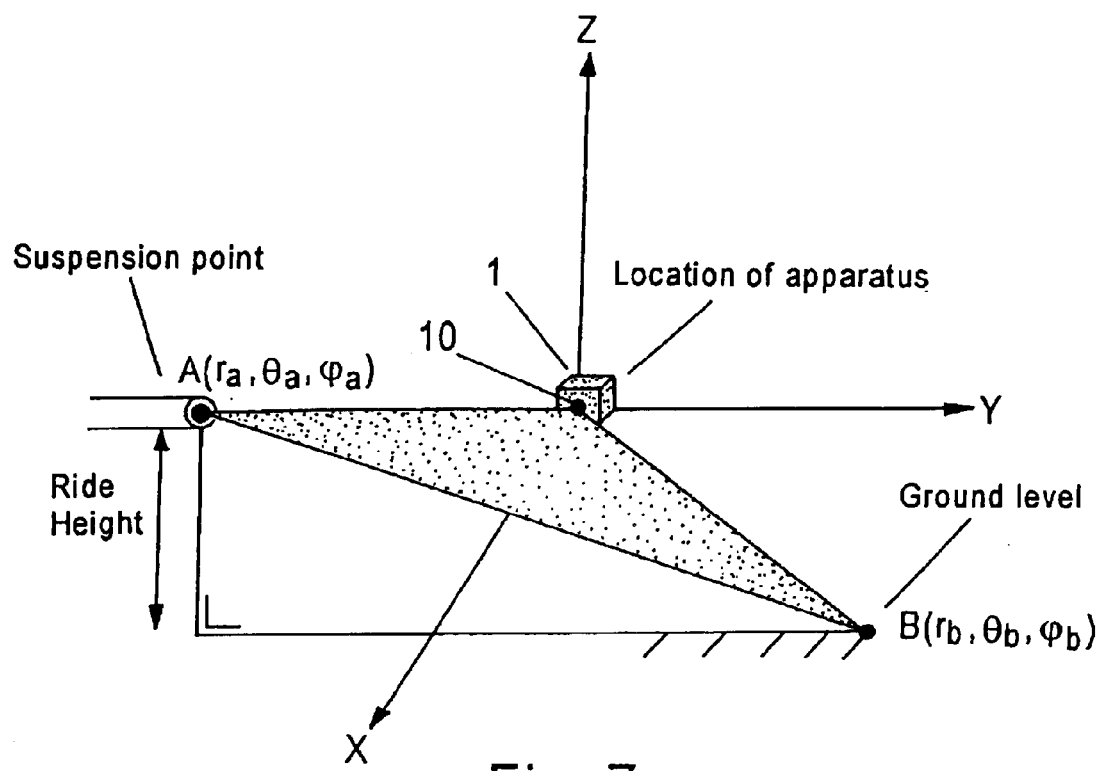
FIG. 7 is a further diagrammatic representation of the module of FIG. 1 in use.

Referring now to FIGS. 6 and 7, the sensor module 1 is illustrated diagrammatically determining the ride height dimension H of a vehicle, where in this case the ride height dimension is determined as being the height of a predetermined point A on the vehicle body vertically above ground level on which the wheel of the vehicle is standing. Thus, the predetermined point A is the point on the vehicle, while the reference point B is any point in the plane of the ground.

Operation for determining the ride height dimension H of this vehicle as illustrated in FIG. 6 is similar to that already described.

Referring now to FIG. 8, there is illustrated another example of a sensor module, generally indicated by the reference number 40, useful in a system for determining the ride height dimension of a vehicle. The module 40 is substantially similar to the sensor module 1 and similar components are identified by the same reference numerals. The main difference between the module 40 and the module 1 is that instead of the probe being provided by a contact probe, the probe is provided by a contactless probe, namely, a range finder 41 which includes a laser distance measuring system for measuring the radial linear distance r from the central datum point 10 to the respective points A and B. Otherwise, the sensor module 40 is similar to the sensor module 1, the only difference being that in use the range finder 41 is sequentially directed towards the respective points A and B for determining the respective spherical co-ordinates of the points A and B in three-dimensional space relative to the datum point 10. Of course, other types of contactless range finding technology may be used instead of the laser system, for example using ultrasonic, infrared or radio frequency signals.

Each of the sensor modules, shown for example in FIGS. 1, 2 and 8, produces encoder signals representing the spherical co-ordinates of each measured point A or B relative to the datum point of the device. The signals may be analog, but preferably are digital or digitally encoded. As described earlier, the measured spherical co-ordinates of the two points are processed to calculate the ride height of the vehicle under test, in a manner corresponding to the manufacturer's specifications for the particular vehicle. The component of the system that performs the ride height calculations responsive to signals from a sensor module 1 or 40 is referred to herein generically as a "processor" or "computing element". The necessary calculations may be performed by hardwired logic circuitry, but in other implementations, a microprocessor or other programmable computing device executes such calculations. The microprocessor could be an element of a dedicated measurement system.

Alternatively, the computing device is a general-purpose computer, for example, serving as part of a wheel alignment system or other vehicle diagnostic system. Examples of computer-based systems for providing wheel alignment and/or other vehicle diagnostic applications are disclosed in: U.S. Pat. No. 6,405,111 to Rogers et al. entitled "System and Method for Distributed Computer Automotive Service Equipment;" U.S. Pat. No. 6,327,785 to Dale, Jr. et al. entitled "Four Sensor System for Wheel Alignment;" U.S. Pat. No. 6,323,776 to Jackson et al. entitled "Method and Apparatus of Automatically Identifying Faults in a Machine Vision Measuring System;" and U.S. Pat. No. 6,134,487 to Healy entitled "Automated Suspension Correction for Twin I-beam Suspensions." U.S. Pat. No. 5,734,569 to Rogers et al. discloses a computer interface board for electronic automotive vehicle service equipment, which may provide an interface to a ride height measuring device. Of course those skilled in the art will be familiar with other computer-based vehicle diagnostic systems suitable for use with one of the sensor modules discussed above.

It is assumed that those skilled in the art are familiar with the structure and operation of such computer-based diagnostic systems as well as general-purpose computers. However, for completeness, it may be helpful to consider an example, using a general purpose computer, in somewhat more detail.

The general-purpose computer is controlled by software programming, at least to perform the desired ride height computations, and often to perform other related functions, such as identifying measurement points specified by particular manufacturers, adjusting the computation procedure to conform to the manufacture's specifications (e.g., to use equation (1) or to use equation (2)), and providing specified height data for different vehicles for comparison to the measured results. Of course, any of a number of different types of computer may be used, for the height measurement alone or in combination with related vehicle service functions. However, an example may utilize a computing device within the class commonly referred to as a personal computer or "PC." Although those familiar with the vehicle diagnostic arts and/or the data processing arts will generally be familiar with such computers and their associated software, it may be helpful to summarize the structural and functional aspects thereof as they might relate to the ride height measurement.

Figure 10:
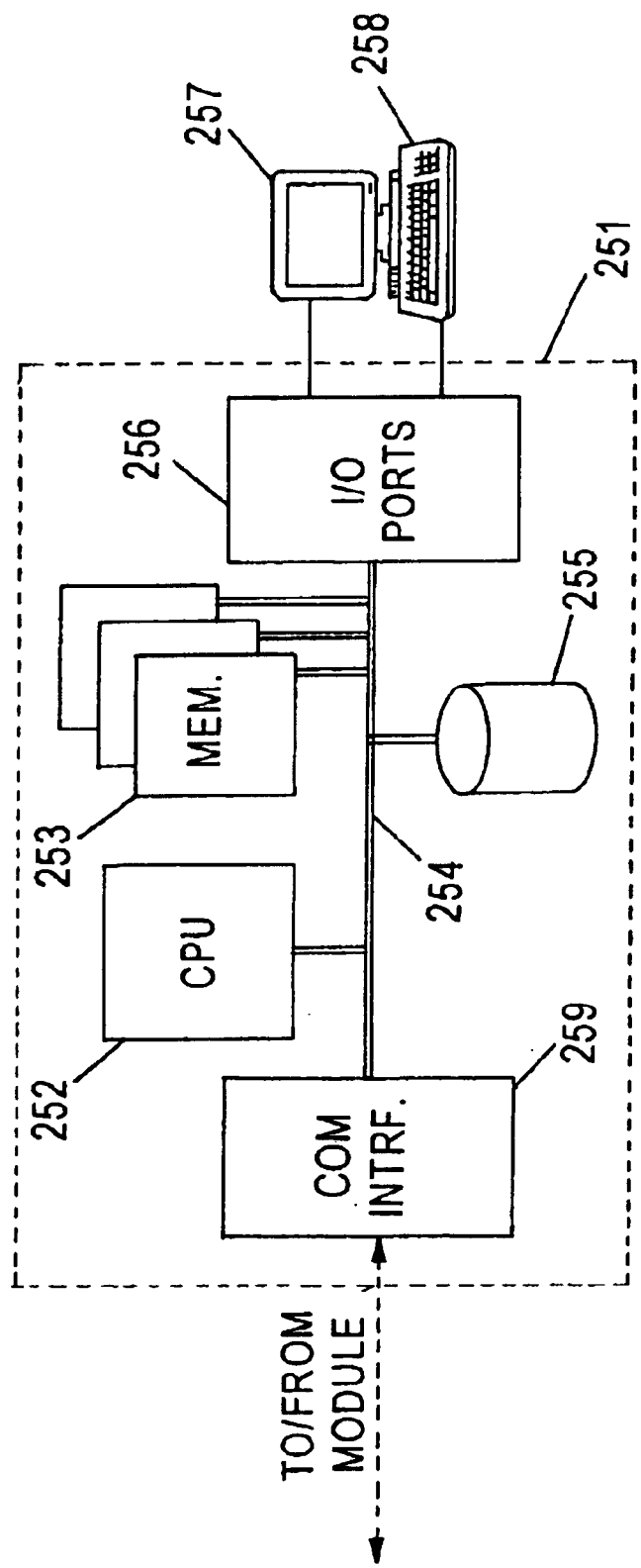
FIG. 10 is a simplified functional block diagram of a personal computer implementation of a data processing system for processing signals from the sensor module, to determine the desired ride height parameter.

FIG. 10 is a functional block diagram of a PC or workstation type implementation of a computer system 251, which may serve as the means to compute the vehicle ride height from the encoder signals produced by one or more of the sensor modules shown in FIGS. 1, 2 and 8. In such an application, one function of the system 251 is to process encoder signals so as to determine the particular ride height parameter desired for a vehicle under test. As noted, the system 251 may provide other related information about different types of vehicles, for example, relating to the particular points manufacturers specify for each different type of vehicle as well as specifications for the ride height parameters when the vehicle is new or worn by usage. The computer system 251 may also perform a variety of functions related to wheel alignment, for example, using the computed ride height as one of the wheel alignment parameters. The system may run a number of other programs that are useful to the mechanic and/or other personnel in the auto shop.

The exemplary computer system 251 contains a central processing unit (CPU) 252, memories 253 and an interconnect bus 254. The CPU 252 may contain a single microprocessor, or may contain a plurality of microprocessors for configuring the computer system 252 as a multi-processor system. The memories 253 include a main memory and a read only memory. The main memory typically includes dynamic random access memory (DRAM) and high-speed cache memory. Examples of read only memories include ROM, PROM, EEPROM, flash memory and the like. In operation, the main memory stores at least portions of instructions and data for execution by the CPU 252.

The mass storage may include one or more magnetic disk or tape drives or optical disk drives, for storing data and instructions for use by CPU 252. For a PC type implementation, for example, at least one mass storage system 255 in the form of a disk drive or tape drive, stores the operating system and application software as well as data. The mass storage 255 within the computer system 251 may also include one or more drives for various portable media, such as a floppy disk, a compact disc read only memory (CD-ROM), or an integrated circuit non-volatile memory adapter (i.e. PC-MCIA adapter) to input and output data and code to and from the computer system 251.

The system 251 also includes one or more input/output interfaces for communications, shown by way of example as an interface 259 for data communications. For purposes of the ride height measurement application, the interface 259 provides two-way data communications with one or more of the devices 1 useful for determining ride height, which were described above relative to FIGS. 1, 2 and 8. For example, the interface 259 may be a USB hub providing two or more ports for USB cable links to/from an interface within the device 1, for communication of the encoder signals. Other common forms of serial or parallel data interfaces may be used. The physical link from the computer system 251 to the ride height sensor module 1 or 40 may utilize any convenient wire, fiber or wireless media.

Although not shown, another communication interface may provide communication via a network (not shown), if desired. Such an additional interface may be a modem, an Ethernet card or any other appropriate data communications device. Any external communications may use hard wiring or wireless technologies.

The computer system 251 further includes appropriate input/output ports 256 for interconnection with a display 257 and a keyboard 258 serving as the respective user interface. For example, the computer may include a graphics subsystem to drive the output display 257. The output display 257 may include a cathode ray tube (CRT) display or liquid crystal display (LCD). Although not shown, the PC type system 251 typically would include a port for connection to a printer. The input control devices for such an implementation of the system 251 would include the keyboard 258 for inputting alphanumeric and other key information. The input control devices for the system 251 may further include a cursor control device (not shown), such as a mouse, a trackball, stylus, touchpad, or cursor direction keys. The links of the peripherals 257, 258 to the system 251 may be wired connections or use wireless communications. The display, keyboard and other user input elements may be separate from the system 251, e.g., in a desktop PC type implementation. Alternatively, the user interface elements may be integrated with the system 251, e.g., in a laptop PC configuration.

The computer system 251 typically runs a variety of applications programs and stores data, enabling one or more interactions via the user interface, provided through elements such as 257 and 258 to implement the desired processing. For ride height measurement applications, the programming will include appropriate code to process the encoder signals to produce the desired height measurement results, as described earlier, and to display the results to the user. The computer system 251 will typically run an application or shell specifically adapted to provide the user interface for input and output of desired information for ride height measurement, and possibly wheel alignment and/or other related vehicle services. As noted, because it is a general-purpose system, the device 251 may run any one or more of a wide range of other desirable application programs.

The components contained in the computer systems 251 are those typically found in general purpose computer systems used as servers, workstations, personal computers, network terminals, and the like. In fact, these components are intended to represent a broad category of such computer components that are well known in the art.

At various times, the relevant programming for the ride height measurement and any related application(s), such as the wheel alignment application, may reside on one or more of several different media. For example, the programming may be stored on a hard disk 255 and loaded into RAM or the like within main memory 253 for execution by the CPU 252. The programming also may reside on or be transported by other media for uploading into the system 251, to essentially install the programming. Hence, at different times all or portions of the executable code or data for any or all of these software elements may reside in physical media or be carried by electromagnetic media or be transported via a variety of different media to program the particular system 251.

Program aspects of the technology may be thought of as "products," typically in the form of executable code and/or associated data that is carried on or by a type of machine readable medium, in this case for enabling the system to process the measurement signals to determine the ride height of the vehicle under test. The executable code and/or associated data controls the operation of the diagnostic tool, computer or other programmable device used for implementing the ride height measurement calculations as described herein.

Physical media include registers and the like in the CPU 252 and the memory 253, 255 of the computer system 251, such as various semiconductor memories, tape drives, disc drives and the like of general-purpose computer systems. All or portions of the software may at times be communicated through the Internet or various other telecommunication networks. Such communications, for example, may be to load the software from another computer (not shown) into the computer system 251 or into another network element, such as a web server used for software distribution or distribution of vehicle related diagnostic information. Thus, another type of media that may bear the software elements includes optical, electrical and electromagnetic waves, such as used across physical interfaces between local devices, through wired and optical landline networks and over various air-links.

Hence, terms regarding computer or machine "readable medium" (or media) as used herein relate to any physical medium or transmission medium that participates in providing instructions to a processor for execution. Such a medium may take many forms, including but not limited to, non-volatile media, volatile media, and transmission media. Nonvolatile media include, for example, optical or magnetic disks, such as any of the storage devices in the system 251 of FIG. 10. Volatile media include dynamic memory, such as main memory. Physical transmission media include coaxial cables; copper wire and fiber optics, including the wires that comprise a bus within a computer system. Carrier signal type transmission media can also take the form of electric or electromagnetic signals, or acoustic or light waves such as those generated during radio frequency (RF) and infrared (IR) data communications. Common forms of machine or computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave transporting data or instructions, or any other medium from which a computer can read. Various forms of such media may be involved in carrying one or more sequences of one or more instructions to a processor for execution, in order to implement the ride height measurement calculations.

The techniques disclosed herein allow for generic measurement of a wide variety of different possible types of vehicle ride height. The technology here determines the desired height measurement with respect to a three-dimensional co-ordinate space, rather that one-dimensional techniques that have proven ineffective in the past.

Those skilled in the art will recognize that the concepts disclosed herein have wide applicability and may admit of a wide range of modifications. Examples of the sensor module may utilize different types of contact or contactless probes, instead of those specifically shown in the drawings. As another example, the mechanical encoders may be replaced with optical, electrical, magnetic or electromagnetic encoders. The housing may take any desirable shape. As described above and shown in the drawings, the vehicle under test is a wheeled land vehicle, such as a car, van or truck. The techniques and equipment described above may be adapted to measurements of other types of vehicle suspensions, for example, to test the ride height of an aircraft when resting on its undercarriage or to test the ride height of a tracked vehicle (e.g. a tank, tractor, or the like).

While the foregoing has described what are considered to be the best mode and/or other examples, it is understood that various modifications may be made therein and that the concept or concepts disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A method of determining a ride height dimension of a vehicle, comprising:

determining a set of spherical co-ordinates in three-dimensional space for a first point with respect to a datum point, the first point serving as a reference point for measurement of the ride height dimension of the vehicle, wherein the first point has a generally fixed relationship with respect to a ground plane;

determining a set of spherical co-ordinates in three-dimensional space for a second point with respect to the datum point, the second point being on the vehicle, wherein the second point is a manufacturer-specified point having a fixed relationship with respect to a body of the vehicle; and computing the ride height dimension of the vehicle from the spherical co-ordinates of the first and second points.

2. The method of claim 1, wherein the ride height dimension of the vehicle corresponds to a manufacturer-specified vertical distance.

3. The method of claim 2, wherein the computing step comprises:

computing one or more components of Cartesian co-ordinates of each of the first and second points relative to the datum point, from the spherical co-ordinates of the first and second points; and determining an absolute vertical difference between vertical components of the calculated Cartesian co-ordinates of the first and second points, representing the vertical difference in height between the first and second points.

4. The method of claim 2, wherein the computing step comprises:

multiplying a radial value of the spherical co-ordinates for the first point with a cosine of an angle of the spherical co-ordinates for the first point relative to a vertical, to determine a vertical co-ordinate of the first point;

multiplying a radial value of the spherical co-ordinates for the second point with a cosine of an angle of the spherical co-ordinates for the second point relative to a vertical, to determine a vertical co-ordinate of the second point; and determining the difference between the vertical co-ordinate of the first point and the vertical co-ordinate of the second point, so as to compute the vertical difference in height between the first and second points.

5. The method of claim 1, wherein the ride height dimension of the vehicle corresponds to a manufacturer-specified distance at a non-vertical angle with respect to the ground plane.

6. The method of claim 5, wherein the computing step comprises:

computing Cartesian co-ordinates of each of the first and second points relative to the datum point, from the spherical co-ordinates of the first and second points; and processing the Cartesian co-ordinates of the first and second points to determine distance between the first and second points.

7. The method of claim 1, wherein the first point is a manufacturer-specified point on the suspension of the vehicle having a fixed relationship to the ground plane.

8. The method of claim 1, wherein the first point is a point in the ground plane.

9. The method of claim 1, wherein the second point is a manufacturer-specified point on the suspension of the vehicle having a fixed relationship to the body of the vehicle.

10. The method of claim 1, wherein the second point is a manufacturer-specified point on the body of the vehicle.

11. An apparatus for determining a ride height dimension of a vehicle, comprising:

means for determining a set of spherical co-ordinates in three-dimensional space for a reference point with respect to a datum point, and for determining a set of spherical co-ordinates in three-dimensional space for a predetermined point on the vehicle with respect to the datum point wherein:

the first point has a generally fixed relationship with respect to a around plane; and the second point is a manufacturer-specified point having a fixed relationship with respect to a body of the vehicle; and means for computing the ride height dimension of the vehicle from the spherical co-ordinates of the reference point and the predetermined point on the vehicle.

12. The apparatus of claim 11, wherein:

the means for determining comprises a sensor module for taking measurements of the reference point and the predetermined point on the vehicle and generating signals corresponding to the spherical co-ordinates of the reference point and the predetermined point on the vehicle; and the means for computing comprises a processor, coupled for communication with the sensor module, for computing the ride height dimension of the vehicle in response to the signals generated by the sensor module.

13. A system for determining a designated ride height dimension of a vehicle, comprising:

a sensor module, for measuring spherical co-ordinates in three-dimensional space of two designated points, one of the designated points being a reference point relative to the vehicle, and the other one of the designated points being a point on the vehicle, wherein:

the first point has a generally fixed relationship with respect to a ground plane; and the second point is a manufacturer-specified point having a fixed relationship with respect to a body of the vehicle; and a processor, coupled to receive signals relating to the measured spherical co-ordinates from the sensor module, for processing the measured spherical co-ordinates of the two designated points to compute a value for the designated ride height dimension of the vehicle.

14. The system of claim 13, wherein the processor computes the designated ride height dimension of the vehicle by determining a difference between vertical components of Cartesian co-ordinates derived from the measured spherical co-ordinates of the two designated points.

15. The system of claim 13, wherein the processor computes the designated ride height dimension of the vehicle by determining distance between of the two designated points from the processing of the measured spherical co-ordinates of the two designated points.

16. The system of claim 13, wherein the sensor module comprises:

a housing defining mutually perpendicular X, Y and Z axes, wherein the Z axis is vertical axis, the X and Y axes are horizontal, and the origin of the X, Y and Z axes defines a datum point for measuring spherical co-ordinates in three-dimensional space;

a linear measurement probe pivotally supported by the housing for measuring a respective linear radial distance between the datum point and each of the two designated points;

a first angular encoder, responsive to orientation of the linear measurement probe, for measuring a respective first angular co-ordinate for each of the two designated points relative to a horizontal reference; and a second angular encoder, responsive to orientation of the linear measurement probe, for measuring a respective second angular co-ordinate for each of the two designated points relative to a vertical reference.

17. The system of claim 16, further comprising a linear measurement device providing distance signals responsive to operation of the probe, wherein the processor receives signals from the linear measurement device and the first and second angular encoders, and the processor processes the received signals to determine a difference between vertical components of Cartesian co-ordinates of the two designated points, as the designated ride height dimension of the vehicle.

18. The system of claim 16, further comprising a linear measurement device providing distance signals responsive to operation of the probe, wherein the processor receives signals from the linear measurement device and the first and second angular encoders, and the processor processes the received signals to determine distance between of the two designated points, as the designated ride height dimension of the vehicle.

19. A sensor module for use in a system for determining a ride height dimension of a vehicle based on co-ordinates of points on a vehicle in three-dimensional space, the sensor module comprising:

a housing defining mutually perpendicular X, Y and Z axes, wherein the Z axis is vertical axis, the X and Y axes are horizontal, and the origin of the X, Y and Z axes defines a datum point for measuring spherical co-ordinates in three-dimensional space;

a probe supported by the housing for measuring a respective linear radial distance between the datum point and each of the two designated points, one of the designated points being a reference point relative to the vehicle, and the other one of the designated points being a point on the vehicle;

a first angular encoder, responsive to orientation of the probe, for producing a signal representing a measurement of a respective first angular co-ordinate for each of the two designated points relative to a horizontal reference; and a second angular encoder, responsive to orientation of the probe, for producing a signal representing a measurement of a respective second angular co-ordinate for each of the two designated points relative to a vertical reference, wherein:

the probe comprises a contact probe mounted on the housing for pivotal movement about the vertical Z axis and one of the horizontal axes and a linear measurement device responsive to operation of the contact probe;

the first angular encoder is responsive pivotal movement of the contact probe about the vertical Z axis; and the second angular encoder is responsive pivotal movement of the contact probe about a horizontal axis.

20. The sensor module as in claim 19, wherein the linear measurement device comprises a string attached to the contact probe, a spool from which the string is withdrawn as the probe is moved from the sensor module into contact with respective ones of the designated points, and a third encoder coupled to the spool for generating a signal representing distance of withdrawal of the string from the spool.

21. A sensor module for use in a system for determining a ride height dimension of a vehicle based on co-ordinates of points on a vehicle in three-dimensional space, the sensor module comprising:

a housing defining mutually perpendicular X, Y and Z axes, wherein the Z axis is vertical axis, the X and Y axes are horizontal, and the origin of the X, Y and Z axes defines a datum point for measuring spherical co-ordinates in three-dimensional space;

a probe supported by the housing for measuring a respective linear radial distance between the datum point and each of the two designated points, one of the designated points being a reference point relative to the vehicle, and the other one of the designated points being a point on the vehicle;

a first angular encoder, responsive to orientation of the probe, for producing a signal representing a measurement of a respective first angular co-ordinate for each of the two designated points relative to a horizontal reference; and a second angular encoder, responsive to orientation of the probe, for producing a signal representing a measurement of a respective second angular co-ordinate for each of the two designated points relative to a vertical reference, wherein:

the probe comprises a contactless probe mounted in the housing for pivotal movement about the vertical Z axis and one of the horizontal axes;

the first angular encoder is responsive pivotal movement of the contactless probe about the about the vertical Z axis;

the second angular encoder is responsive pivotal movement of the contactless probe about a horizontal axis; and the contactless probe comprises a distance range finder.

22. A sensor module for use in a system for determining a ride height dimension of a vehicle based on co-ordinates of points on a vehicle in three-dimensional space, the sensor module, a housing defining mutually perpendicular X, Y and Z axes, wherein the Z axis is vertical axis, the X and Y axes are horizontal, and the origin of the X, Y and Z axes defines a datum point for measuring spherical co-ordinates in three-dimensional space;

a probe supported by the housing for measuring a respective linear radial distance between the datum point and each of the two designated points, one of the designated points being a reference point relative to the vehicle, and the other one of the designated points being a point on the vehicle;

a first angular encoder, responsive to orientation of the probe, for producing a signal representing a measurement of a respective first angular co-ordinate for each of the two designated points relative to a horizontal reference;

a second angular encoder, responsive to orientation of the probe, for producing a signal representing a measurement of a respective second angular co-ordinate for each of the two designated points relative to a vertical reference;

a bracket supporting the probe for pivotal movement about a horizontal axis; and a pivotal mounting for the bracket, enabling pivotal movement of the bracket about the vertical Z axis, wherein:

the first angular encoder is responsive the pivotal movement of the bracket; and the second angular encoder is responsive the pivotal movement of the probe.

23. A data processor programmed to perform a sequence of steps, the sequence of steps comprising:

receiving measurement signals relating to a set of spherical co-ordinates in three-dimensional space for a first point, designated as a reference point relative to the vehicle, with respect to a datum point, wherein the first point has a generally fixed relationship with respect to a ground plane;

receiving measurement signals relating to a set of spherical co-ordinates in three-dimensional space for a second point, with respect to the datum point, the second point being on the vehicle, wherein the second point is a manufacturer-specified point having a fixed relationship with respect to a body of the vehicle; and processing the received measurement signals to compute the ride height dimension of the vehicle from the spherical co-ordinates of the first and second points.

24. The data processor of claim 23, wherein the processing step performed by the data processor comprises computing the ride height dimension of the vehicle by determining a difference between vertical components of Cartesian co-ordinates derived from the spherical co-ordinates of the first and second points.

25. The data processor of claim 23, wherein the processing step performed by the data processor comprises computing the ride height dimension of the vehicle by determining distance between of the first and second points from the spherical co-ordinates of the first and second points.

26. A program product, comprising executable code transportable by at least one machine readable medium, wherein execution of the code by at least one programmable processor causes the at least one programmable processor to perform a sequence of steps, comprising:

receiving measurement signals relating to a set of spherical co-ordinates in three-dimensional space for a first point, designated as a reference point relative to the vehicle, with respect to a datum point, wherein the first point has a generally fixed relationship with respect to a ground plane;

receiving measurement signals relating to a set of spherical co-ordinates in three-dimensional space for a second point, with respect to the datum point, the second point being on the vehicle, wherein the second point is a manufacturer-specified point having a fixed relationship with respect to a body of the vehicle; and processing the received measurement signals to compute the ride height dimension of the vehicle from the spherical co-ordinates of the first and second points.

27. A program product, comprising executable code transportable by at least one machine readable medium, wherein execution of the code by at least one programmable processor causes the at least one programmable processor to perform a sequence of steps, comprising:

receiving measurement signals relating to a set of spherical co-ordinates in three-dimensional space for a first point, designated as a reference point relative to the vehicle, with respect to a datum point and receiving measurement signals relating to a set of spherical co-ordinates in three-dimensional space for a second point, with respect to the datum point, the second point being on the vehicle, wherein the processing step comprises computing the ride height dimension of the vehicle by determining a difference between vertical components of Cartesian co-ordinates derived from the spherical co-ordinates of the first and second points.

28. A program product, comprising executable code transportable by at least one machine readable medium, wherein execution of the code by at least one programmable processor causes the at least one programmable processor to perform a sequence of steps, comprising:

receiving measurement signals relating to a set of spherical co-ordinates in three-dimensional space for a first point, designated as a reference point relative to the vehicle, with respect to a datum point; and receiving measurement signals relating to a set of spherical co-ordinates in three-dimensional space for a second point, with respect to the datum point, the second point being on the vehicle, wherein the processing step comprises computing the ride height dimension of the vehicle by determining distance between of the first and second points from the spherical co-ordinates of the first and second points.

29. A data processor programmed to perform a sequence of steps, the sequence of steps comprising:

receiving measurement signals relating to a set of spherical co-ordinates in three-dimensional space for a first point, designated as a reference point relative to the vehicle, with respect to a datum point;

receiving measurement signals relating to a set of spherical co-ordinates in three-dimensional space for a second point, with respect to the datum point, the second point being on the vehicle; and processing the received measurement signals to compute the ride height dimension of the vehicle from the spherical co-ordinates of the first and second points, wherein the processing step performed by the data processor comprises computing the ride height dimension of the vehicle by determining a difference between vertical components of Cartesian co-ordinates derived from the spherical co-ordinates of the first and second points.

30. A data processor programmed to perform a sequence of steps, the sequence of steps comprising:

receiving measurement signals relating to a set of spherical co-ordinates in three-dimensional space for a first point, designated as a reference point relative to the vehicle, with respect to a datum point;

receiving measurement signals relating to a set of spherical co-ordinates in three-dimensional space for a second point, with respect to the datum point, the second point being on the vehicle; and processing the received measurement signals to compute the ride height dimension of the vehicle from the spherical co-ordinates of the first and second points, wherein the processing step performed by the data processor comprises computing the ride height dimension of the vehicle by determining distance between of the first and second points from the spherical co-ordinates of the first and second points.

* * * * *